Patented Feb. 17, 1948

2,435,999

UNITED STATES PATENT OFFICE 2,435,999

PROCESS FOR THE PRODUCTION OF MOLD-ING POWDER FROM A LOWER ALIPHATIC ESTER OF CELLULOSE

Henry Dreyfus, London, and James Henry Rooney and Bernard Shaw, Spondon, near Derby, England; Claude Bonard, administrator of said Henry Dreyfus, deceased, assignors, by direct and mesne assignments, to Celanese Corporation of America, a corporation of Delaware No Drawing. Application February 9, 1944, Serial No. 521,644. In Great Britain October 16, 1942

13 Claims. (Cl. 106—177)

This invention relates in particular to the production of a plasticised stock having a basis of cellulose acetate.

In the production from artificial organic film-forming polymers of a plasticised stock suitable for moulding, it is common practice to incorporate the plasticiser by dissolving the polymer together with the plasticiser in a volatile liquid which is a solvent both for polymer and plasticiser, and, then, after filtering the solution, to remove the solvent, for example by working on hot rolls. The stock may then be ground to form a moulding powder. This method ensures even distribution of plasticiser through the mass and enables insoluble contaminants of the polymer to be removed by filtration. The method has, however, the serious disadvantage that the solvent is tenaciously held by the polymer and its removal is in consequence an expensive, time-consuming operation.

According to the present invention, plasticised stock suitable for moulding is made by forming a hot solution of the polymer in a mixture comprising a solvent plasticiser and a volatile liquid non-solvent for the polymer, said mixture being a solvent when hot but a non-solvent when cold for the polymer, cooling the solution and removing the bulk of the non-solvent. By this method the plasticiser can be evenly distributed throughout the stock, the hot solution can be filtered to remove any contaminants and the volatile non-solvent can be more readily removed than can an active solvent. Moreover, the process can be carried out in such a way that the plasticised stock is obtained as a powder on cooling the hot solution. Thus the grinding operation which is necessary to form the moulding powder by the prior process is eliminated. From the plasticised stock, transparent mouldings of good clarity, tenacity and impact strength can be obtained.

By a volatile liquid non-solvent for the polymer is meant a liquid which is not a solvent for the polymer at ordinary temperatures and which is sufficiently volatile to be capable of removal by vaporisation from the plasticised stock without substantial loss of plasticiser. The non-solvent may be a single liquid or a mixture of liquids, for example a mixture of a water-soluble organic liquid with water. It is generally preferable to employ a single non-solvent liquid of boiling point below 100° C., but in the case of some polymers it is difficult to find such a single non-solvent liquid. In such cases it is convenient to employ a water-soluble volatile solvent for the polymer diluted with sufficient water to render the resulting mixture a non-solvent at ordinary temperatures. Diluents other than water can be employed in some cases but are preferably avoided. Whatever the nature of the non-solvent liquid it should not be less volatile than water. Ethanol has been found a most useful volatile non-solvent for polymers which are insoluble therein, and this liquid can also be used diluted with water for polymers which are soluble in the undiluted liquid. Methanol can be used similarly but is preferably avoided on account of its toxicity. Normal propanol and isopropanol can also be used alone or diluted with water, although their somewhat higher boiling points make them generally less suitable than ethanol.

The ratio of non-solvent to plasticiser is important. In a typical case it will be found that when the ratio is below a certain value a solution of the polymer made at about 70–80° C. will remain a liquid solution even when cooled to ordinary temperatures. As the ratio is increased beyond this value a range is reached within which a solution made at the elevated temperature forms a gel on cooling to ordinary temperatures. A further increase in the ratio gives solutions which when cooled from the elevated temperature to ordinary temperature give a granular stock containing the polymer, plasticiser and non-solvent. With a still further increase in the ratio the mixture of non-solvent and plasticiser becomes incapable of dissolving the polymer even at temperatures as high as 80° C. The mixture may form an unfilterable gel with the polymer at such temperatures or, when the ratio of non-solvent to plasticiser is sufficiently high, may be quite inert towards the polymer. For the process of the present invention the ratio of non-solvent to plasticiser should be within the range giving solutions at elevated temperatures which give a solid stock when cooled to ordinary temperatures. The concentration of polymer in the hot solution should preferably be sufficiently high to ensure that the solution solidifies as a whole on cooling instead of separating into a solid phase and a liquid phase. On the other hand the concentration should not be so high as to make filtration difficult. Solutions in which the ratio of polymer plus plasticiser to non-solvent is between 60:40 and 70:30 are generally most suitable.

It is of advantage to stir the solution during cooling. In this way the grain-size can be controlled. The stirring may be started before cooling sets in, or after the solution has cooled to some extent, and may be continued after the completion of the cooling.

The following examples illustrate the invention:

Example 1

In a closed mixer maintained at a temperature of 75–80° C. a solution is made of the following composition, all the parts being by weight:

|  | Parts |
|---|---|
| Cellulose acetate | 100 |
| Dimethyl phthalate | 35 |
| Ethanol | 80 |

The cellulose acetate is of acetyl value about 52% calculated as acetic acid, and a 6% solution of it in a mixture of acetone 50 parts, alcohol 22 parts and benzene 28 parts at 25° C., has a viscosity, measured by the Ostwald method, of 13% that of glycerine at the same temperature.

The solution is filtered through a cannon-filter maintained at 75° C. whence it passes to a mixer in which it is allowed to cool to room temperature (say 25° C.) and is stirred by the blades of the mixer. If a very fine powder suitable for injection moulding is required the stirring is continued for longer than if a coarser powder is required, for instance for compression moulding, and the stirring may even be dispensed with if a coarse powder is required. As the solution cools, whether or not it be stirred, precipitation sets in and eventually the whole body of solution is converted into a powder. The powder is discharged from the mixture and dried by evaporation, the alcohol vapours being recovered. The dried powder may be used for the production of moulded articles by the hot compression-moulding process or by injection-moulding.

Moulding powders obtained as described above are particularly suitable for the production of transparent sheet materials by a compression-moulding operation. Suitable conditions are:

Temperature about 140° C.–150° C.; pressure about 1000–1500 lbs. per sq. in.

Instead of dimethyl phthalate, tri-(monochlorethyl) phosphate can be employed.

The ratio of ethanol to plasticiser can be varied to some extent from that specified above. It may be as low as 60:40 but should not be substantially lower if a granular precipitate is to be obtained. Thus, for example, when the ratio is reduced to 55:45 a gel instead of a powder is obtained on cooling. The ratio may be as high as 72:28 but should not be substantially higher. Thus, for example, at a ratio of 75:25 a gel instead of a readily filterable liquid is obtained even at temperatures as high as 80° C., whereas at a ratio of 90:10 the mixture of alcohol and plasticiser is a non-solvent for the cellulose acetate even at 80° C.

The concentration of the initial solution of cellulose acetate can also vary but is preferably sufficiently high for the solution to solidify as a whole when cooled rather than to separate into a granular phase and a liquid phase. For this reason it is preferred to work with solutions in which the ratio of cellulose acetate plus plasticiser to non-solvent is not less than about 66:34.

In a similar way to that described above for cellulose acetate, moulding powders having a basis of polyvinyl chloride may be made, using tricresyl phosphate, dibutyl phthalate, diethyl phthalate or dimethyl phthalate as the plasticiser.

Example 2

The process is carried out as in Example 1, but employing a solution (at 75–80° C.) of the following composition:

|  | Parts |
|---|---|
| Ethyl cellulose | 100 |
| Tricresyl phosphate | 15 |
| Ethanol | 80 |
| Water | 35 |

The ethyl cellulose employed has an ethoxy content of about 48% and a viscosity between about 100–400 centipoises, determined on a 5% solution by weight in a mixture of 80 parts toluene and 20 parts ethanol at 25° C. The water is necessary since without it the ethyl cellulose would remain in solution even at ordinary temperatures.

Example 3

The process is carried out as in Example 2 except that the solution has the following composition:

|  | Parts |
|---|---|
| Ethyl cellulose (as specified in Example 2) | 100 |
| Tricresyl phosphate | 30 |
| Ethanol | 80 |
| Water | 25 |

Example 4

The process is carried out as described in Example 2 except that a solution is employed of the following composition:

|  | Parts |
|---|---|
| Ethyl cellulose (as specified in Example 2) | 100 |
| Tricresyl phosphate | 70 |
| Ethanol | 80 |
| Water | 24 |

The proportions of water in Examples 2–4 are such that the aqueous alcohol is a non-solvent for the plasticiser at 25° C. Instead of tricresyl phosphate, diethyl phthalate or dibutyl phthalate may be used as the plasticiser for ethyl cellulose.

The moulding powders of the invention may be shaped by other processes than that of compression-moulding. They may, for example, be injection-moulded or extruded. The powders may be shaped while they still contain a small proportion, e. g., 5% by weight of the non-solvent.

Other solvent plasticisers for the polymer may be employed. Thus, for example, with cellulose acetate, diethyl-phthalate, dimethoxy-ethyl-phthalate, methyl-phthalyl-ethyl-glycolate, ethyl-phthalyl-ethyl-glycolate, or triacetin may be used. Plasticisers of low solvent power or which are substantially without solvent power for the polymer may be employed in small proportions in conjunction with the solvent plasticiser. Thus, for example, with cellulose acetate, triphenyl-phosphate, tributyl-phosphate and tricresyl-phosphate may be employed in the proportion of about 25–35% on the weight of the solvent plasticiser.

Instead of the cellulose derivative specified in the examples other thermoplastic water-resistant cellulose derivatives may be used, for example cellulose propionate, cellulose butyrate, cellulose acetate-propionate, cellulose acetate-butyrate, cellulose acetate-stearate, cellulose acetate-laureate, cellulose acetate-nitrate, benzyl cellulose, ethyl hexyl cellulose and ethyl cellulose acetate. Cellulose acetate and ethyl celluloses of higher or lower acetyl content or ethoxy content respectively than are specified in the examples may be employed. Where high water resistance is desirable cellulose ethers having a high content of an ether group containing at least two carbon atoms and mixed cellulose esters containing a relatively high proportion of acyl groups of a fatty acid higher than acetic, are particularly important. In this connection mention may be made of ethyl celluloses containing at least 48% ethoxy groups and cellulose acetate-stearates containing over 50% combined stearic acid. Other polymers which may be employed include polyethyl acrylate, polymethyl methacrylate, polyvinyl acetate, polyvinyl chloride-acetate, polystyrene, and other polymers of vinyl compounds, including copolymers of two or more vinyl compounds.

As indicated above, one of the most important applications of the invention is in the production by a moulding process of transparent sheet material. Although the invention is applicable to the production of sheets of transparent material of thickness no greater than about 0.01", it is in connection with the production of thicker sheets, for example 0.05 to 0.1 or 0.5" or even higher that it is of special advantage. Such materials have previously been made by processes involving solution of the polymer and plasticizer in active solvents therefor, and the removal of such solvents has involved laborious and expensive operations such as working the stock on hot rolls before moulding and subjecting the products to a seasoning period lasting many weeks. These disadvantages are avoided by the process of the present invention.

The sheet materials of the invention may be colourless or substantially colourless (very small quantities of a suitable blue dye may be incorporated in the material to neutralize any yellowness which might develop in production or use). On the other hand, coloured sheet materials may be produced by the incorporation of suitable dyes or pigments in the solution from which the stock is produced. Substances adapted to absorb radiant energy of wave length outside that of the visible spectrum, for example ultra-violet light, may also be incorporated in the stock as may substances adapted to polarise light transmitted through the sheet material.

The invention is not limited to the production of sheet materials. Thus, the plasticized stock of the invention can be employed to produce articles of other shapes by pressure moulding, injection moulding or extrusion. Filling materials, for example wood flour, asbestos floats and fibres, fibrous material having a basis of cellulose or regenerated cellulose, and mineral pigments, for example barium sulphate may be incorporated in the stock. Thus, for example, fillers may be mixed with the powder obtained by cooling the hot solution of plasticized polymer, or introduced into the hot solution of plasticized polymer after filtration.

The plasticized stock of the invention may also be used in the production of laminated materials, for example by the union of layers of paper, fabric or wood. Among such laminated products are stiff or semi-stiff fabrics suitable for the production of articles of wearing apparel, for example, collars, shirt fronts, belts, straps, and sweat bands for hats; rigid laminated fabrics suitable for the construction of wing sections of aircraft and materials such as plywood and fibre-board.

A further useful application of the invention is in the production of constructional materials comprising particles of wood bonded together by the plasticized polymer such as are described, for instance, in U. S. application S. No. 502,304, filed September 14, 1943, corresponding to British application No. 11,515/42 filed August 17, 1942. Such materials may, for example, be obtained by hot pressure moulding of the plasticized stock in powder form in admixture with sawdust or wood chips.

Having described our invention, what we desire to secure by Letters Patent is:

1. Process for the production of a molding powder from a lower aliphatic acid ester of cellulose which is insoluble in water, methanol, ethanol and the propanols, which comprises forming a filterable solution of a lower aliphatic acid ester of cellulose at a temperature above 70° C. in a homogeneous liquid mixture consisting of a normally liquid solvent plasticizer for the cellulose ester, 0–35% based on the weight of said solvent plasticizer of a non-solvent plasticizer therefor, selected from the class consisting of tricresyl phosphate and triphenyl phosphate, and at least one of the alcohols selected from the class consisting of methanol, ethanol and the propanols, allowing the solution to cool to about 25° C. while stirring, collecting the resulting homogeneous powder containing cellulose ester, plasticizer and alcohol, and evaporating alcohol therefrom.

2. Process for the production of a molding power from cellulose acetate, which comprises forming a filterable solution of cellulose acetate at a temperature above 70° C. in a homogeneous liquid mixture consisting of a normally liquid solvent plasticizer for the cellulose acetate, 0–35% based on the weight of said solvent plasticizer of a non-solvent plasticizer therefor, selected from the class consisting of tricresyl phosphate and triphenyl phosphate, and an alcohol selected from the class consisting of methanol, ethanol and the propanols allowing the solution to cool while stirring, collecting the resulting homogeneous powder containing cellulose acetate, plasticizer and alcohol, and evaporating alcohol therefrom.

3. Process for the production of a molding powder from cellulose acetate, which comprises forming a solution of the cellulose acetate at a temperature above 70° C. in a homogeneous liquid mixture consisting of tri-(monochlorethyl) phosphate and ethanol, the ratio of ethanol to tri-(monochlorethyl) phosphate being between 60:40 and 72:28 and the ratio of cellulose acetate plus tri-(monochlorethyl) phosphate to ethanol being between 60:40 and 70:30 by weight, allowing the solution to cool while stirring, collecting the resulting powder, and evaporating ethanol therefrom.

4. Process for the production of a molding powder from cellulose acetate, which comprises forming a solution of the cellulose acetate at a temperature above 70° C. in a homogeneous liquid mixture consisting of tri-(monochlorethyl) phosphate, 25–35% based on the tri-(monochlorethyl) phosphate of a plasticizer selected from the class consisting of tricresyl phosphate and triphenyl phosphate, and ethanol, the ratio of ethanol to total plasticizer being between 60:40 and 72:28 and the ratio of cellulose acetate plus plasticizer to ethanol being between 60:40 and 70:30 by weight, allowing the solution to cool while stirring, collecting the resulting powder, and evaporating ethanol therefrom.

5. Process for the production of a molding powder from cellulose acetate, which comprises forming a solution of the cellulose acetate at a temperature above 70° C. in a homogeneous liquid mixture consisting of dimethyl phthalate and ethanol, the ratio of ethanol to dimethyl phthalate being between 60:40 and 72:28 and the ratio of cellulose acetate plus dimethyl phthalate to ethanol being between 60:40 and 70:30 by weight, allowing the solution to cool while stirring, collecting the resulting powder, and evaporating ethanol therefrom.

6. Process for the production of a molding powder from cellulose acetate, which comprises forming a solution of the cellulose acetate at a temperature above 70° C. in a homogeneous liquid mixture consisting of dimethyl phthalate, 25-35% based on the dimethyl phthalate of a plasticizer selected from the class consisting of tricresyl phosphate and triphenyl phosphate, and ethanol, the ratio of ethanol to total plasticizer being between 60:40 and 72:28 and the ratio of cellulose acetate plus plasticizer to ethanol being between 60:40 and 70:30 by weight, allowing the solution to cool while stirring, collecting the resulting powder, and evaporating ethanol therefrom.

7. Process for the production of a molding powder from a lower aliphatic acid ester of cellulose which is insoluble in water, methanol, ethanol and the propanols, which comprises forming a filterable solution of a lower aliphatic acid ester of cellulose at a temperature above 70° C. in a homogeneous liquid mixture consisting of a normally liquid solvent plasticizer for the cellulose ester, 0-35% based on the weight of said solvent plasticizer of a non-solvent plasticizer therefor, selected from the class consisting of tricresyl phosphate and triphenyl phosphate, and at least one of the alcohols selected from the class consisting of methanol, ethanol and the propanols, the solvent plasticizer and alcohol being present in such proportions that cooling the solution to about 25° C. yields a homogeneous powder containing cellulose ester, plasticizer and alcohol, filtering the hot solution, allowing the solution to cool while stirring, collecting the resulting powder, and evaporating alcohol therefrom.

8. Process for the production of a molding powder from cellulose acetate, which comprises forming a solution of the cellulose acetate at a temperature above 70° C. in a homogeneous liquid mixture consisting of tri-(monochlorethyl) phosphate and ethanol, the ratio of ethanol to tri-(monochlorethyl) phosphate being between 60:40 and 72:28 and the ratio of cellulose acetate plus tri-(monochlorethyl) phosphate to ethanol being between 60:40 and 70:30 by weight, filtering the hot solution, allowing the solution to cool while stirring, collecting the resulting powder, and evaporating ethanol therefrom.

9. Process for the production of a molding powder from cellulose acetate, which comprises forming a solution of the cellulose acetate at a temperature above 70° C. in a homogeneous liquid mixture consisting of tri-(monochlorethyl) phosphate, 25-35% based on the tri-(monochlorethyl) phosphate of a plasticizer selected from the class consisting of tricresyl phosphate and triphenyl phosphate, and ethanol, the ratio of ethanol to total plasticizer being between 60:40 and 72:28 and the ratio of cellulose acetate plus plasticizer to ethanol being between 60:40 and 70:30 by weight, filtering the hot solution, allowing the solution to cool while stirring, collecting the resulting powder, and evaporating ethanol therefrom.

10. Process for the production of a molding powder from cellulose acetate, which comprises forming a solution of the cellulose acetate at a temperature above 70° C. in a homogeneous liquid mixture consisting of dimethyl phthalate and ethanol, the ratio of ethanol to dimethyl phthalate being between 60:40 and 72:28 and the ratio of cellulose acetate plus dimethyl phthalate to ethanol being between 60:40 and 70:30 by weight, filtering the hot solution, allowing the solution to cool while stirring, collecting the resulting powder, and evaporating ethanol therefrom.

11. Process for the production of a molding powder from cellulose acetate, which comprises forming a solution of the cellulose acetate at a temperature above 70° C. in a homogeneous liquid mixture consisting of dimethyl phthalate, 25-35% based on the dimethyl phthalate of a plasticizer selected from the class consisting of tricresyl phosphate and triphenyl phosphate, and ethanol, the ratio of ethanol to total plasticizer being between 60:40 and 72:28 and the ratio of cellulose acetate plus plasticizer to ethanol being between 60:40 and 70:30 by weight, filtering the hot solution, allowing the solution to cool while stirring, collecting the resulting powder, and evaporating ethanol therefrom.

12. Process for the production of plasticized stock suitable for molding, which comprises forming a hot solution containing cellulose acetate, dimethyl phthalate and ethanol in the approximate relative proportions by weight of 100:35:80, filtering said solution at about 75° C. and cooling the solution to about 25° C. while stirring.

13. Process for the production of plasticized stock suitable for molding, which comprises forming a hot solution of cellulose acetate containing tri-(monochlorethyl) phosphate and ethanol in the approximate relative proportions by weight of 100:35:80, filtering said solution at about 75° C. and cooling the solution to about 25° C. while stirring.

HENRY DREYFUS.
JAMES HENRY ROONEY.
BERNARD SHAW.

REFERENCES CITED

The following references are of record in the file of this patent:

UNITED STATES PATENTS

| Number | Name | Date |
|---|---|---|
| 1,913,478 | Dorr et al. | June 13, 1933 |
| 1,041,118 | Lindsay | Oct. 15, 1912 |

FOREIGN PATENTS

| Number | Country | Date |
|---|---|---|
| 417,937 | Great Britain | Oct. 11, 1934 |
| 1,441 | Great Britain | 1910 |
| 619,148 | Germany | Sept. 23, 1935 |

Certificate of Correction

Patent No. 2,435,999.　　　　　　　　　　　　　　　　　February 17, 1948.

HENRY DREYFUS ET AL.

It is hereby certified that errors appear in the printed specification of the above numbered patent requiring correction as follows: Column 6, line 1, after the date "1943" strike out the comma and insert instead a period; lines 1 and 2, strike out "corresponding to British application No. 11,515/42 filed August 17, 1942."; line 38, claim 2, after the word "cool" insert *to about 25° C.*; and that the said Letters Patent should be read with these corrections therein that the same may conform to the record of the case in the Patent Office.

Signed and sealed this 20th day of April, A. D. 1948.

[SEAL]

THOMAS F. MURPHY,
　　　　　　　　　　　　　　　　　　*Assistant Commissioner of Patents.*